US010286491B2

(12) United States Patent
Nakagawa et al.

(10) Patent No.: US 10,286,491 B2
(45) Date of Patent: May 14, 2019

(54) LASER WELDING METHOD

(71) Applicant: Panasonic Intellectual Property Management Co., Ltd., Osaka (JP)

(72) Inventors: Tatsuyuki Nakagawa, Osaka (JP); Yasushi Mukai, Osaka (JP); Atsuhiro Kawamoto, Hyogo (JP); Junji Fujiwara, Osaka (JP); Noriyuki Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 483 days.

(21) Appl. No.: 15/118,630

(22) PCT Filed: Feb. 23, 2015

(86) PCT No.: PCT/JP2015/000836
§ 371 (c)(1),
(2) Date: Aug. 12, 2016

(87) PCT Pub. No.: WO2015/129231
PCT Pub. Date: Sep. 3, 2015

(65) Prior Publication Data
US 2017/0050269 A1    Feb. 23, 2017

(30) Foreign Application Priority Data
Feb. 25, 2014 (JP) .................................. 2014-033754

(51) Int. Cl.
*B23K 26/244* (2014.01)
*B23K 26/082* (2014.01)
(Continued)

(52) U.S. Cl.
CPC ........ *B23K 26/244* (2015.10); *B23K 26/0626* (2013.01); *B23K 26/082* (2015.10); *B23K 26/0876* (2013.01); *B23K 26/22* (2013.01)

(58) Field of Classification Search
CPC .................. B23K 26/244; B23K 26/0876; B23K 26/082; B23K 26/0626
(Continued)

(56) References Cited

U.S. PATENT DOCUMENTS 4,658,110 A * 4/1987 Miller .................. B23K 15/008
219/121.13
5,603,853 A * 2/1997 Mombo-Caristan ........................
B23K 15/006
219/121.64
(Continued)

FOREIGN PATENT DOCUMENTS

JP        61-202788      9/1986
JP        1-321084      12/1989
(Continued)

OTHER PUBLICATIONS

International Search Report of PCT application No. PCT/JP2015/000836 dated May 19, 2015.

*Primary Examiner* — Samuel M Heinrich
(74) *Attorney, Agent, or Firm* — Wenderoth, Lind & Ponack, L.L.P.

(57) ABSTRACT

A laser welding method of the present disclosure has a first step and a second step. In the first step, a first workpiece and a second workpiece are overlaid in a first machining region. In the second step, the first workpiece and the second workpiece are irradiated with laser beam in the first machining region while the laser beam is moved in a spiral path. Moreover, in the second step, the first workpiece and the second workpiece are melted by irradiation of the laser beam to form a liquid phase portion. Furthermore, in the second (Continued)

step, the laser beam is moved so that the liquid phase portion is not irradiated with the laser beam again.

10 Claims, 15 Drawing Sheets

(51) Int. Cl.
*B23K 26/06* (2014.01)
*B23K 26/08* (2014.01)
*B23K 26/22* (2006.01)

(58) Field of Classification Search
USPC ............ 219/121.63, 121.64, 121.78, 121.79
See application file for complete search history.

(56) References Cited

U.S. PATENT DOCUMENTS 9,522,426 B2 * 12/2016 Das .................. B22F 3/1055
9,555,503 B2 * 1/2017 Luick ................ B23K 26/0676
2006/0163221 A1 * 7/2006 Makase .................. B23K 26/08
  219/121.64
2007/0084835 A1 * 4/2007 Dinauer ................. B23K 26/26
  219/121.64
2011/0168682 A1 7/2011 Hagihara et al.

FOREIGN PATENT DOCUMENTS

| | | |
|---|---|---|
| JP | 2004-174570 | 6/2004 |
| JP | 2005-246440 | 9/2005 |
| JP | 2008-126298 | 6/2008 |
| JP | 2009-154186 | 7/2009 |
| JP | 2010-094701 | 4/2010 |
| JP | 2011-140053 | 7/2011 |
| JP | 2011-173146 | 9/2011 |
| JP | 2012-115876 | 6/2012 |
| JP | 2014-004619 | 1/2014 |
| WO | 1999/008829 | 2/1999 |

* cited by examiner (a)

(b)

(a)

(b)

(a)

(b)

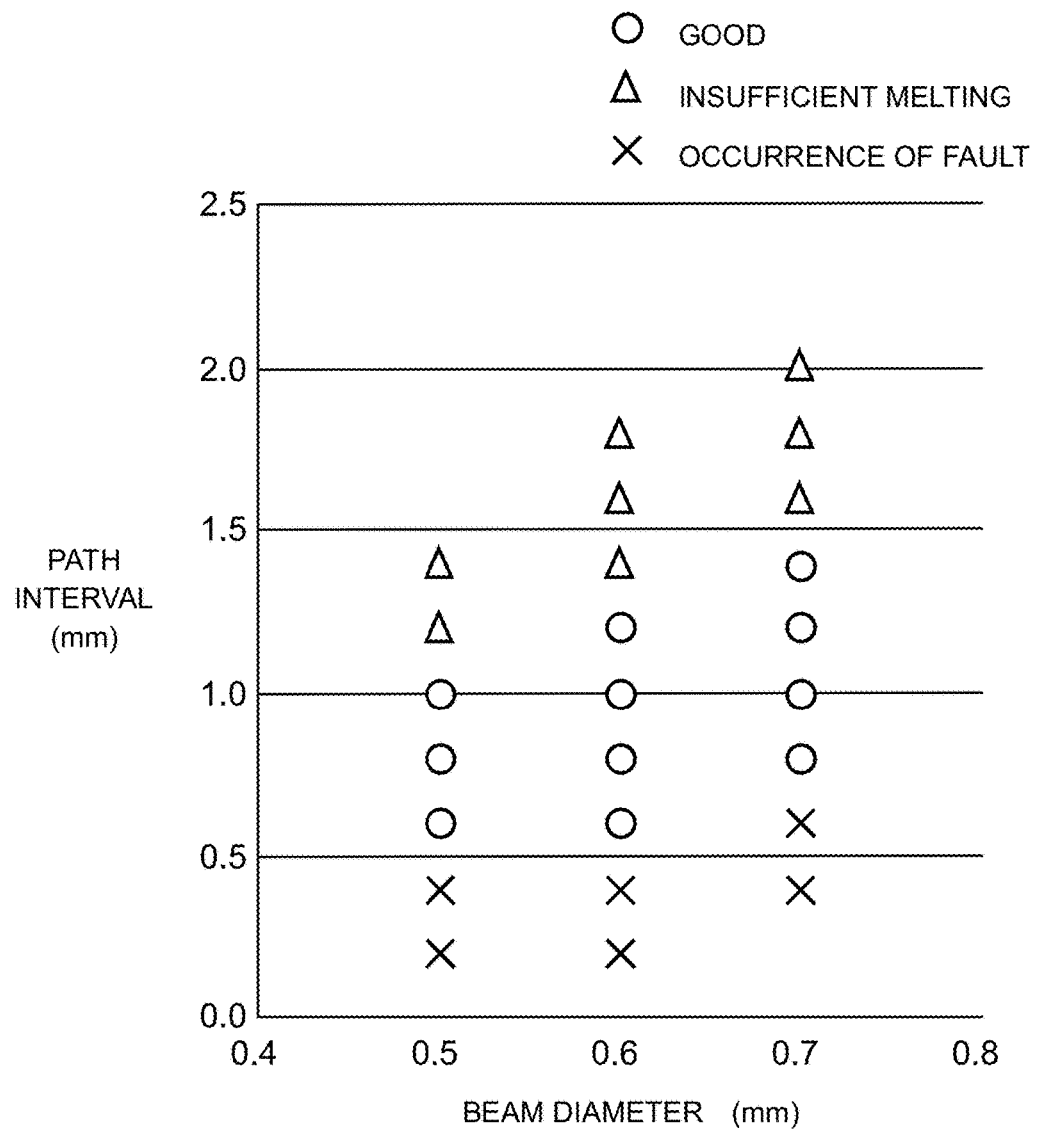

LASER WELDING METHOD

This application is a U.S. national stage application of the PCT international application No. PCT/JP2015/000836.

TECHNICAL FIELD

The present disclosure relates to a laser welding method in which lap-jointed workpieces are spirally irradiated with a laser beam.

BACKGROUND ART

In a laser welding method in which workpieces are lap-welded by irradiation of a laser beam, in order to increase a gap tolerance between the workpieces, a laser welding method in which a wide range of workpieces is irradiated with a laser beam to enlarge a molten pool and to fill a gap between the workpieces has been widely used. However, when the wide range of workpieces is irradiated with the laser beam, bubbles are generated inside the molten pool, and strength of a welded portion significantly lowers. Accordingly, a plurality of methods for removing bubbles generated inside a molten pool has been proposed.

PTL 1 discloses a method in which a molten pool is irradiated with a laser beam to stir a molten pool and to remove bubbles. Furthermore, PTL 2 discloses a method in which pores within a solidified molten metal are eliminated by remelting. Furthermore, PTL 3 discloses a method in which, of a laser irradiation step, bubbles generated in an initial stage where an output of a laser beam is low and in a middle stage where the output of the laser beam is high are discharged in a later stage where the output of the laser beam is low.

CITATION LIST

Patent Literature

PTL 1: Unexamined Japanese Patent Publication No. S61-202788
PTL 2: Unexamined Japanese Patent Publication No. 2005-246440
PTL 3: Unexamined Japanese Patent Publication No. 2008-126298

SUMMARY OF THE INVENTION

However, in the conventional laser welding methods, a step of removing bubbles is conducted in addition to an original laser welding step. Accordingly, a processing time becomes longer by the step of removing bubbles. Moreover, in the conventional laser welding methods, since excessive quantity of heat is given to the workpieces, an effect, such as low strain caused by low heat input, of the laser welding is inhibited.

Therefore, the present disclosure provides a laser welding method in which generation of bubbles in a laser welding step is suppressed and a good welding state can be obtained.

To solve the above-described problems, a laser welding method in one aspect of the present disclosure has a first step and a second step. In the first step, a first workpiece and a second workpiece are overlaid in a first machining region. In the second step, the first workpiece and the second workpiece are irradiated with laser beam in the first machining region while the laser beam is moved in a spiral path. Moreover, in the second step, the first workpiece and the second workpiece are melted by irradiation of the laser beam to form a liquid phase portion. Furthermore, in the second step, the laser beam is moved so that the liquid phase portion is not irradiated with the laser beam again.

According to the one aspect of the laser welding method of the present disclosure, generation of bubbles is suppressed and a good welding state can be obtained.

BRIEF DESCRIPTION OF DRAWINGS

FIG. 15 is a diagram showing a relationship between a path interval of a laser beam and occurrence of poor weld in the exemplary embodiment.

DESCRIPTION OF EMBODIMENT

Exemplary Embodiment

A present exemplary embodiment is described with reference to FIGS. 1 to 14.

Figure 1:
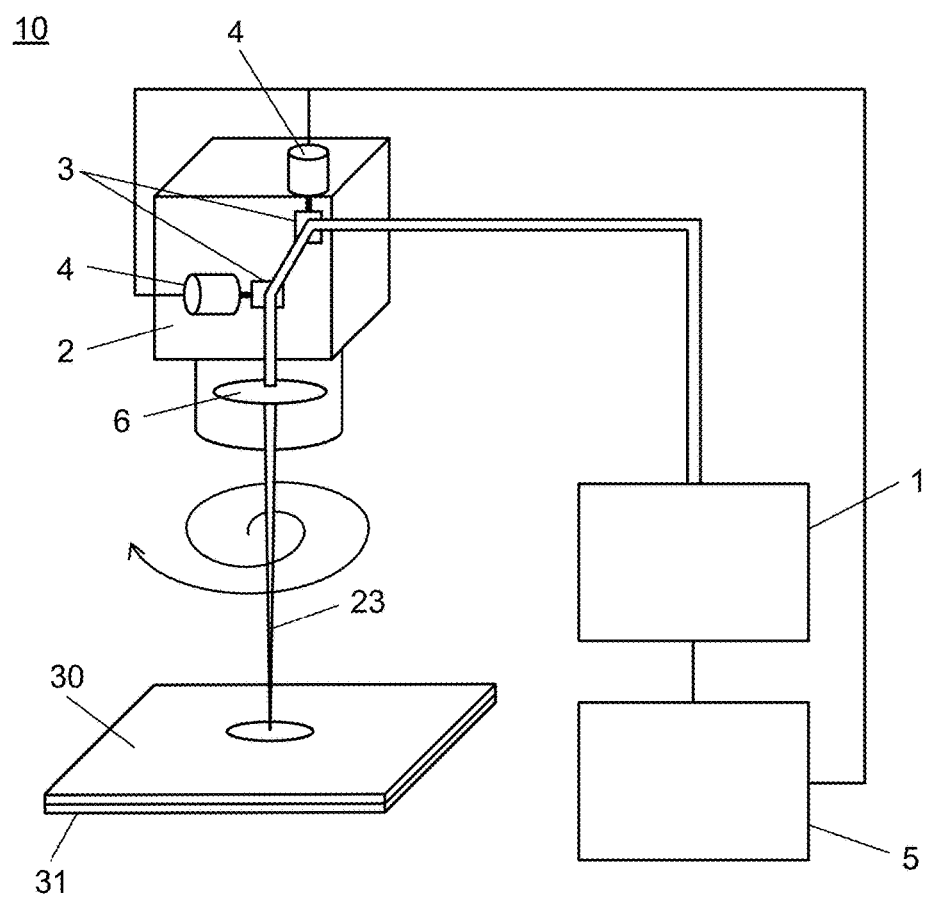
FIG. 1 is a diagram showing a laser welding system using a galvano scanner according to an exemplary embodiment.
Figure 2:
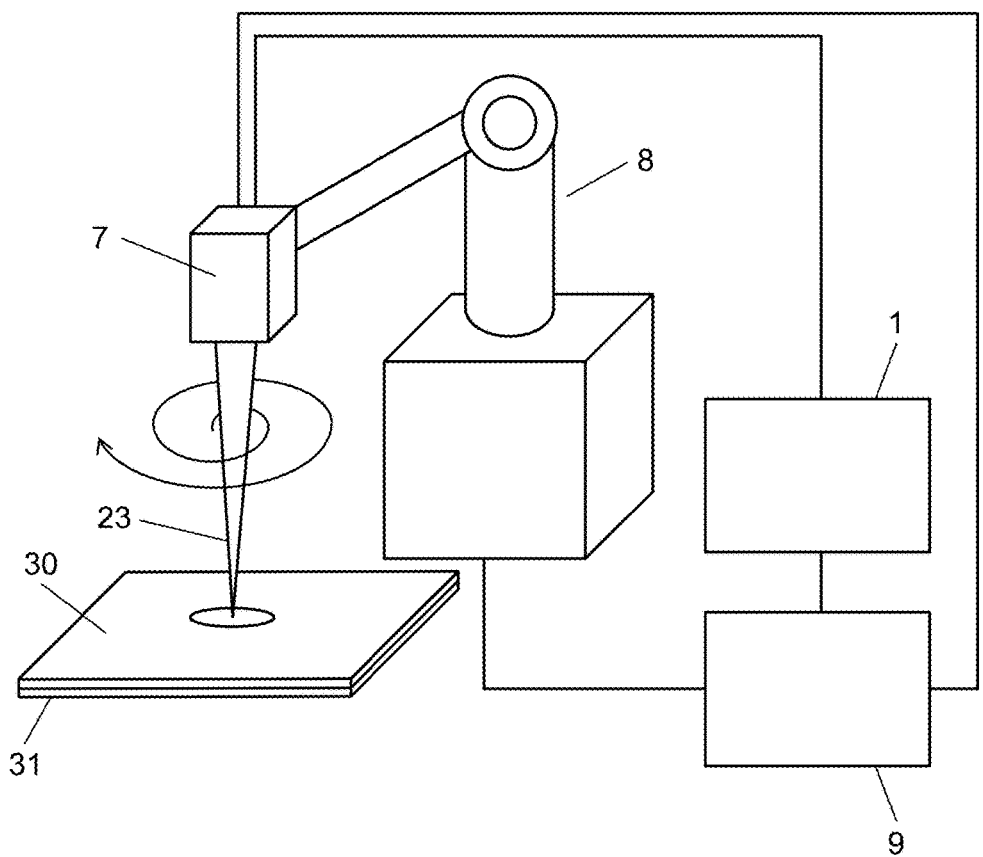
FIG. 2 is a diagram showing a laser welding system using a robot according to the exemplary embodiment.

First, a laser welding system for implementing a laser welding method of the present exemplary embodiment is described with reference to FIGS. 1 and 2. It should be noted that FIG. 1 shows laser welding system 10 using galvano scanner 2 according to the present exemplary embodiment. FIG. 2 shows laser welding system 20 using robot 8 according to the present exemplary embodiment.

In FIG. 1, laser welding system 10 has laser oscillator 1, galvano scanner 2, and scanner control device 5. Laser oscillator 1 generates laser beam 23. Galvano scanner 2 has two galvano mirrors 3, two galvano motors 4, and Fθ lens 6. Galovano mirrors 3 change a path of laser beam 23 two-dimensionally. Two galvano motors 4 rotate galvano mirrors 3 respectively connected to galvano motors 4. Furthermore, two galvano motors 4 are controlled by scanner control device 5. Fθ lens 6 images laser beam 23 on a welding place of workpieces.

As shown in FIG. 1, according to the above-described configuration, in laser welding system 10, galvano scanner 2 irradiates a welding part of the workpieces with laser beam 23. In laser welding system 10, the workpieces formed by overlaying first metal plate 30 (a first workpiece) and second metal plate 31 (a second workpiece) are irradiated with laser beam 23 from a side of first metal plate 30, thereby welding first metal plate 30 and second metal plate 31.

In FIG. 2, laser welding system 20 has laser oscillator 1, welding head 7, robot 8, and robot control device 9. Laser oscillator 1 generates laser beam 23. Welding head 7 images laser beam 23 on a welding part of workpieces. Robot 8 has an end to which welding head 7 is attached and moves welding head 7. Robot control device 9 controls operation of robot 8 or operation of welding head 7. It should be noted that, when an irradiation position of laser beam 23 is moved on the workpieces, robot 8 performs large movement, and welding head 7 performs small movement.

As shown in FIG. 2, according to the above-described configuration, in laser welding system 20, the welding part of the workpieces is irradiated with laser beam 23 by using welding head 7 and robot 8. In laser welding system 20, the workpieces formed by overlaying first metal plate 30 and second metal plate 31 are irradiated with laser beam 23 from a side of first metal plate 30, thereby welding first metal plate 30 and second metal plate 31.

A plurality of rotating prisms may be additionally disposed in either a front or a back of Fθ lens 6 in laser welding system 10 shown in FIG. 1 to change (move) an irradiation position of laser beam 23. Furthermore, a plurality of rotating prisms may be disposed inside welding head 7 in laser welding system 20 shown in FIG. 2 to change (move) the irradiation position of laser beam 23. The irradiation position of laser beam 23 can be rotationally moved by rotating the prisms. Moreover, the irradiation position of laser beam 23 can be spirally moved by changing a radius of rotation.

Here, regarding a point in which a penetration state of the workpieces changes according to an output of laser beam 23 and a welding speed in the laser welding method, first and second comparative examples found by the present inventors are shown below. It should be noted that the first and second comparative examples shown below can be performed by laser welding system 10, 20 shown in FIG. 1 or FIG. 2.

The present inventors have performed spiral path (spiral) laser welding according to three welding conditions including a first welding condition (the first comparative example), a second welding condition (the second comparative example), and a third welding condition (a first example), and observed welding results.

It should be noted that keyhole type laser welding is performed in the first welding condition (the first comparative example). In the keyhole type laser welding, an inside of a molten pool is irradiated with a laser beam with a relatively high output at a relatively low welding speed of less than 3 m/min. Heat conduction type laser welding is performed in the second welding condition (the second comparative example). In the heat conduction type laser welding, an inside of a molten pool is irradiated with a laser beam with a relatively low output at a relatively low welding speed of less than 3 m/min. Keyhole type laser welding is performed in the third welding condition (the exemplary example). In the keyhole type laser welding, an outside and front of a molten pool is irradiated with a laser beam with a relatively high output at a relatively high welding speed of 3 m/min or more.

First Comparative Example

Figure 3:
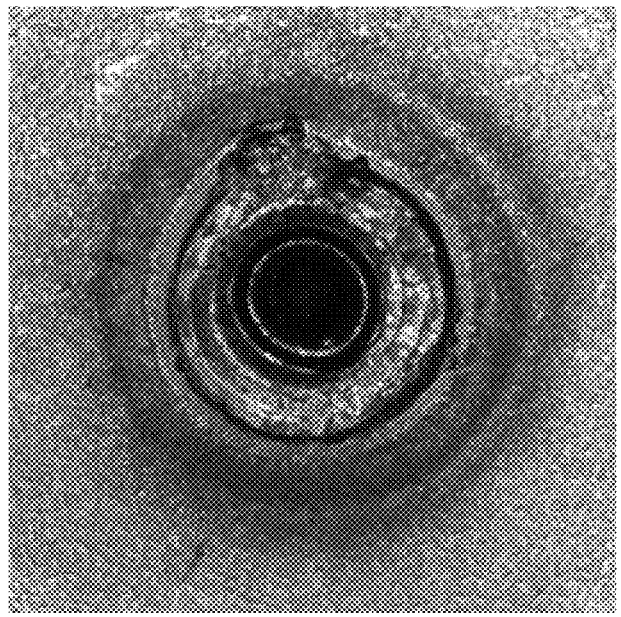
FIG. 3 is a plan view showing results of laser welding in a first comparative example, portion (a) of FIG. 3 is a plan view of an upper surface and portion (b) of FIG. 3 is a plan view of a lower surface.
Figure 3:
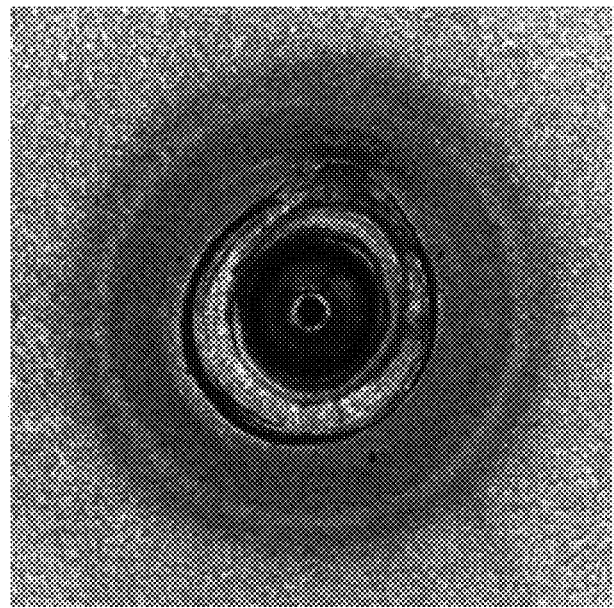
Figure 4:
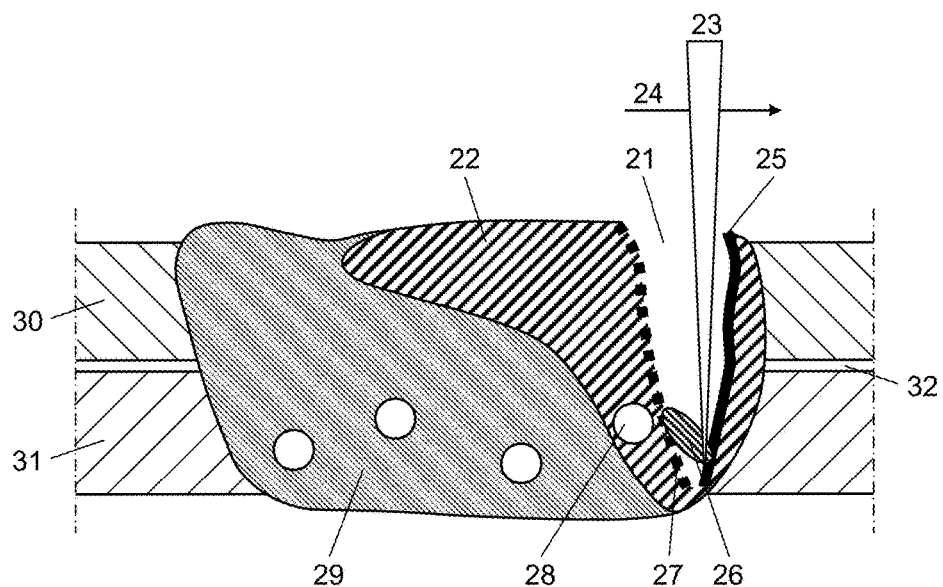
FIG. 4 is a sectional view showing a principle of the laser welding in the first comparative example.
Figure 5:
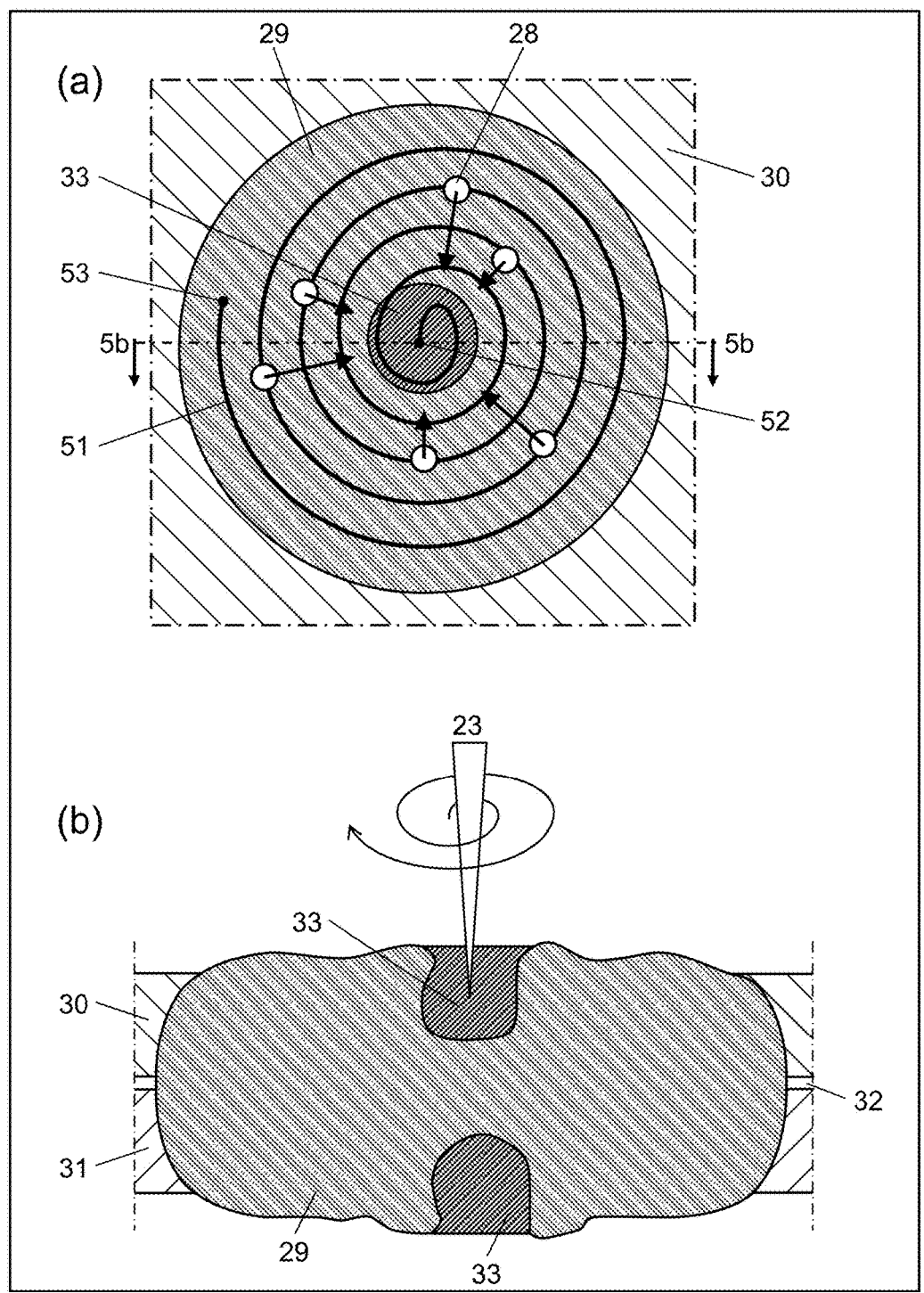
FIG. 5 shows states of the laser welding in the first comparative example, portion (a) of FIG. 5 is a top view and portion (b) of FIG. 5 is a sectional view.

First, the first comparative example is described with reference to FIGS. 3 to 5. FIG. 3 is a plan view showing results of laser welding in a first comparative example, portion (a) of FIG. 3 is a plan view of an upper surface and portion (b) of FIG. 3 is a plan view of a lower surface. FIG. 4 is a sectional view showing a principle of the laser welding in the present comparative example. FIG. 5 shows states of the laser welding in the first comparative example, portion (a) of FIG. 5 is a top view and portion (b) of FIG. 5 is a sectional view.

Portion (a) of FIG. 3 is the plan view of the upper surface and portion (b) of FIG. 3 is the plan view of the lower surface, showing welding states (machining results) of the upper surface and the lower surface of overlaid workpieces in a case where spiral path laser welding is performed on a circular machining region of the workpieces according to the first welding condition. It should be noted that the upper surface is a surface on a side irradiated with a laser beam. For example, the upper surface is a surface of first metal plate 30 on a side of galvano scanner 2 in FIG. 1 and a surface of first metal plate 30 on a side of welding head 7 in FIG. 2.

As shown in FIGS. 3(*a*) and 3(*b*), in a case where the laser welding is performed in the first welding condition, bubbles are broken at a final solidifying point, and a hole is formed on both of the upper surface and the lower surface of the workpieces.

Next, the principle of the laser welding in the first comparative example is considered with reference to FIGS. 4 and 5.

The keyhole type laser welding in which the molten pool is irradiated with laser beam 23 is performed in the first welding condition. As shown in FIG. 4, keyhole 21 is generated in the laser welding of the present comparative example. With this configuration, an energy absorption rate of the workpieces is high, and a sufficient penetration quantity is obtained. However, since the welding speed is less than 3 m/min and relatively slow, laser beam 23 melts and further vaporizes first metal plate 30 and second metal plate 31 on front wall 25 (a portion shown by a thick solid line) of keyhole 21 disposed on a front side in welding direction 24. With this configuration, a large amount of metal vapor 26 is generated from front wall 25 of keyhole 21. Metal vapor 26 enters molten pool 22 from rear wall 27 (a portion shown by a thick dotted line) of keyhole 21 of molten pool 22 formed on a rear side in welding direction 24, and becomes bubble 28. Then, this bubble 28 remains inside resolidified layer 29 as a porosity.

Next, behavior of bubble 28 is further described with reference to FIG. 5. Portion (b) of FIG. 5 is a sectional view taken along a line 5*b*-5*b* in portion (a) of FIG. 5. As shown in portion (a) of FIG. 5, the workpieces are spirally irradiated with laser beam 23 according to the first welding condition. The irradiation of laser beam 23 is started from start point 52, laser beam 23 is moved along path 51 shown by a thick line, and the irradiation of laser beam 23 is ended at end point 53. It should be noted that path 51 continuously changes from start point 52 to end point 53 of the laser welding so as to be gradually separated from start point 52 along a circular arc.

Since the laser welding according to the first welding condition is the keyhole type laser welding, first metal plate 30 and second metal plate 31 can obtain sufficient penetration, and gap 32 between first metal plate 30 and second metal plate 31 shown in FIG. 4 can be filled with molten pool 22 (melt). However, as shown in FIGS. 5(*a*) and 5(*b*), when bubbles 28 generated inside molten pool 22 are solidified, bubbles 28 gather near the surfaces (the upper surface and the lower surface) at a center of molten pool 22 serving as the final solidifying point. Accordingly, as a welding result of the workpieces, the center of molten pool 22 is hollowed out by bubbles 28, and the surfaces are expanded and solidified. Alternatively, gathered bubbles 28 burst to form hole 33 (a recess) on the surfaces. A junction area between first metal plate 30 and second metal plate 31 is reduced by cavity or hole 33 caused by bubbles 28, and sufficient junction strength cannot be obtained.

Second Comparative Example

Figure 6:
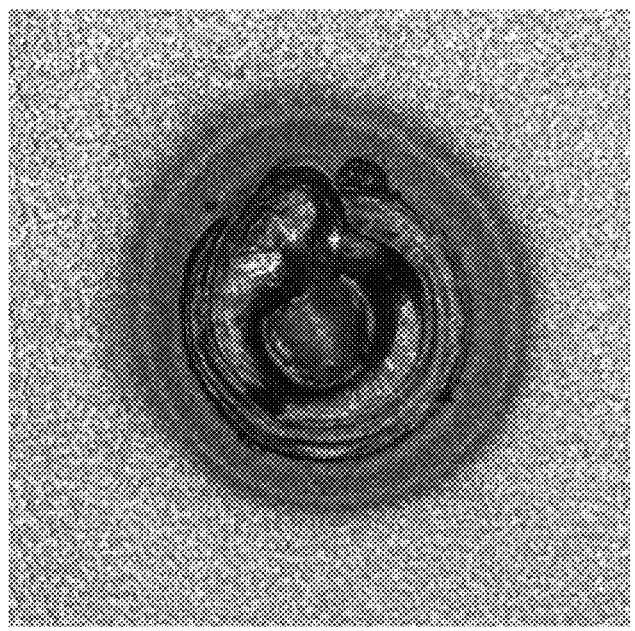
FIG. 6 is a plan view showing results of laser welding in a second comparative example, portion (a) of FIG. 6 is a plan view of an upper surface and portion (b) of FIG. 6 is a plan view of a lower surface.
Figure 6:
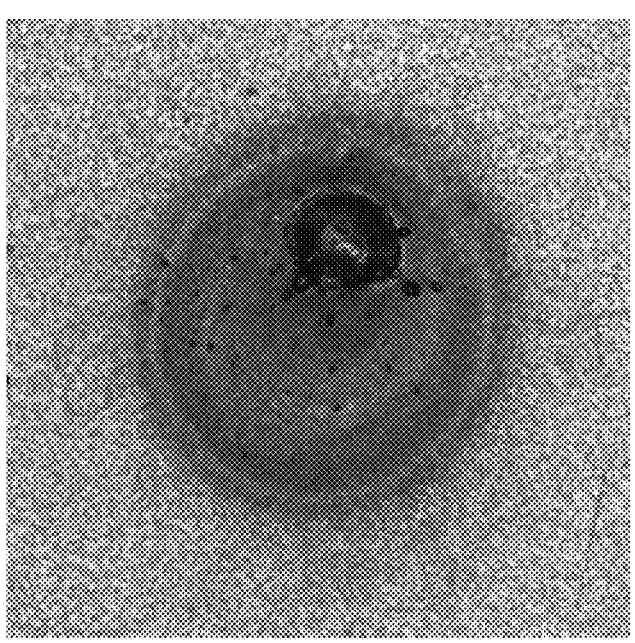
Figure 7:
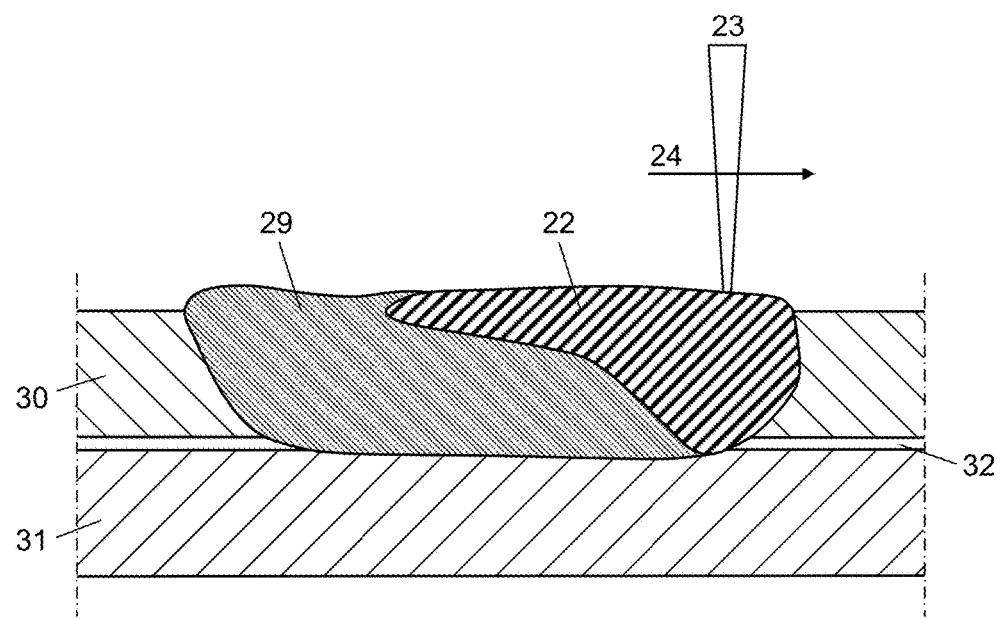
FIG. 7 is a sectional view showing a principle of the laser welding in the second comparative example.
Figure 8:
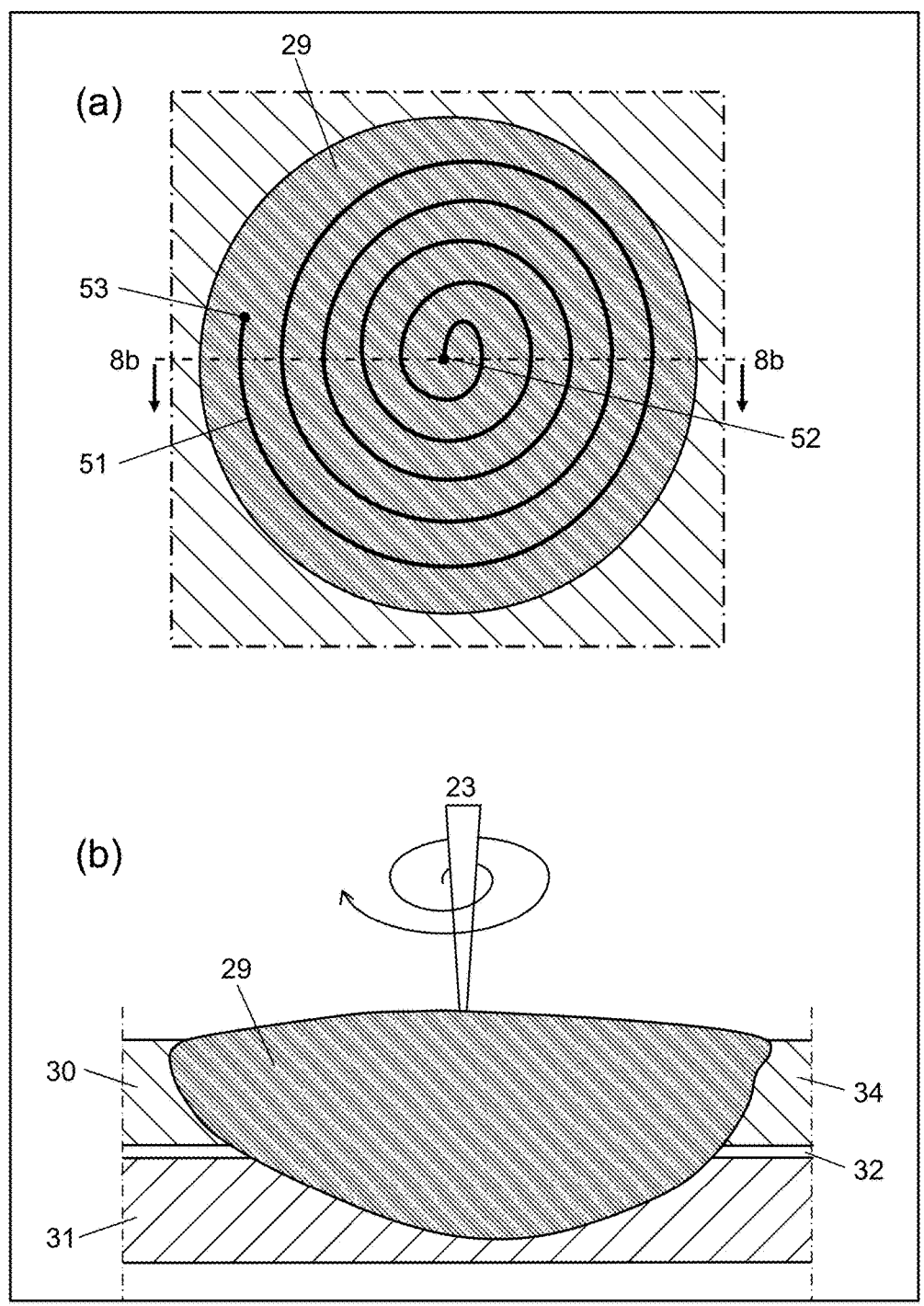
FIG. 8 shows states of the laser welding in the second comparative example, portion (a) of FIG. 8 is a top view and portion (b) of FIG. 8 is a sectional view.

Next, the second comparative example is described with reference to FIGS. 6 to 8. FIG. 6 is a plan view showing results of laser welding in a second comparative example, portion (a) of FIG. 6 is a plan view of an upper surface and portion (b) of FIG. 6 is a plan view of a lower surface. FIG. 7 is a sectional view showing a principle of the laser welding in the present comparative example. FIG. 8 shows states of the laser welding in the second comparative example, portion (a) of FIG. 8 is a top view and portion (b) of FIG. 8 is a sectional view. It should be noted that identical reference marks are used for identical configurations in FIGS. 3 to 5, and description of the reference marks is omitted.

Portion (a) of FIG. 6 is the plan view of the upper surface and portion (b) of FIG. 6 is the plan view of the lower surface, showing welding states (machining results) of the upper surface and the lower surface of overlaid workpieces in a case where spiral path laser welding is performed on a circular machining region of the workpieces according to the second welding condition.

As shown in FIGS. 6(*a*) and 6(*b*), in a case where the laser welding is performed in the second welding condition, the upper surface of the workpieces is melted, and the lower surface of the workpieces is not sufficiently melted.

Next, the principle of the laser welding in the second comparative example is considered with reference to FIGS. 7 and 8.

The heat conduction type laser welding in which the molten pool is irradiated with laser beam 23 is performed in the second welding condition. As shown in FIG. 7, since a power density of laser beam 23 is low and a deep keyhole cannot be made in the laser welding in the present variation, bubble 28 is not generated. However, since there is no deep keyhole, an energy absorption rate of the workpieces is low, and a sufficient penetration quantity cannot be obtained.

Next, the states of the laser welding are concretely described with reference to FIG. 8. Portion (b) of FIG. 8 is a sectional view taken along a line 8*b*-8*b* in portion (a) of FIG. 8. As shown in portion (a) of FIG. 8, the workpieces are spirally irradiated with laser beam 23 according to the second welding condition. The irradiation of laser beam 23 is started from start point 52, laser beam 23 is moved along path 51 shown by a thick line, and the irradiation of laser beam 23 is ended at end point 53.

Since the laser welding according to the second welding condition is the heat conduction type laser welding, first metal plate 30 located on an upper side serving as a side irradiated with laser beam 23 is melted, and second metal plate 32 located on a lower side is not sufficiently melted. Consequently, a penetration shape becomes a bowl shape. Therefore, gap 32 between first metal plate 30 and second metal plate 31 shown in FIG. 7 cannot be filled. Since a junction area between first metal plate 30 and second metal plate 31 is small, sufficient junction strength cannot be obtained.

First Example

Figure 9:
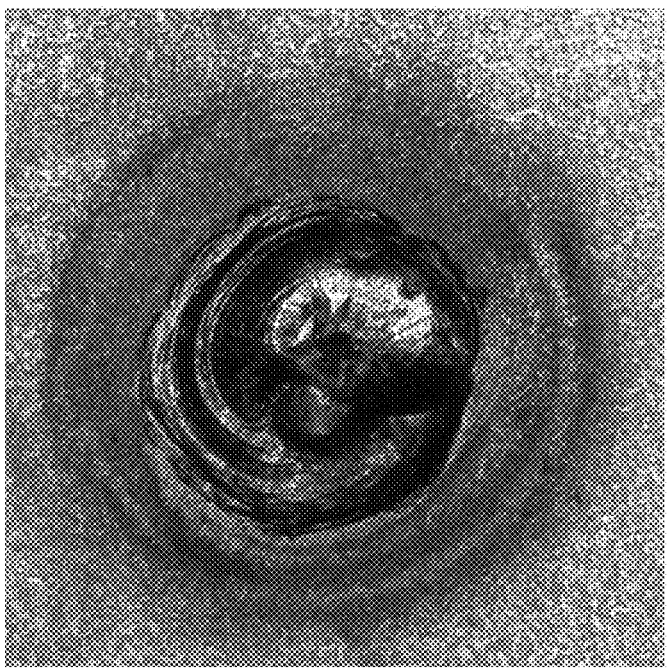
FIG. 9 is a plan view showing results of laser welding in a first example, portion (a) of FIG. 9 is a plan view of an upper surface and portion (b) of FIG. 9 is a plan view of a lower surface.
Figure 9:
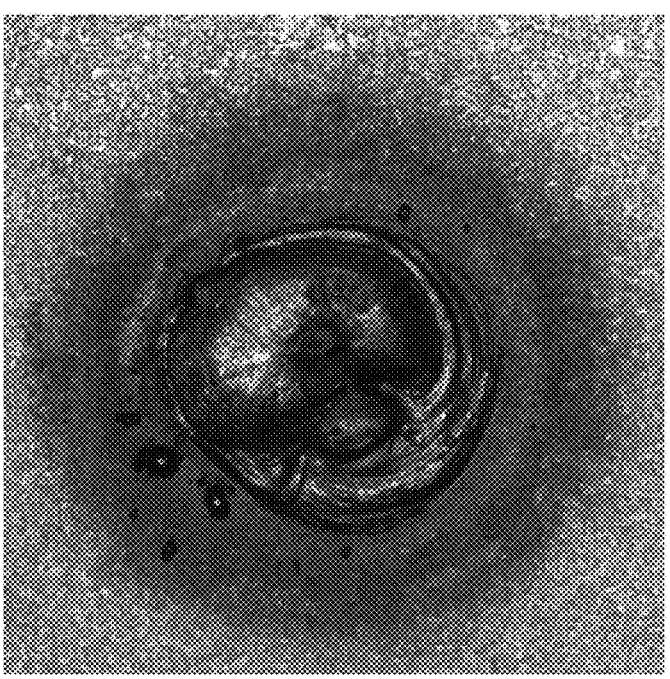
Figure 10:
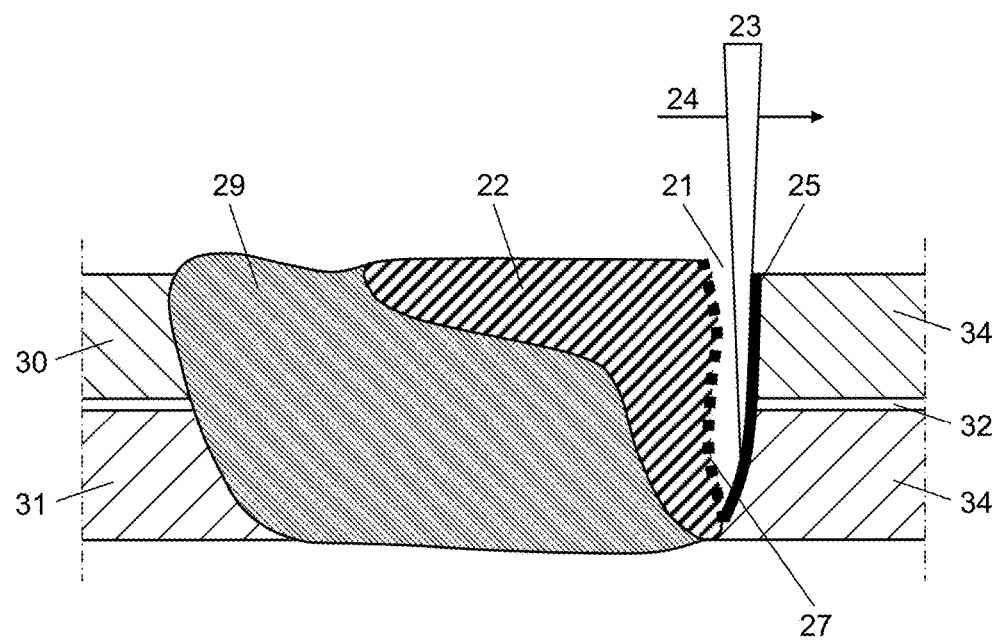
FIG. 10 is a sectional view showing a principle of the laser welding in the first example.
Figure 11:
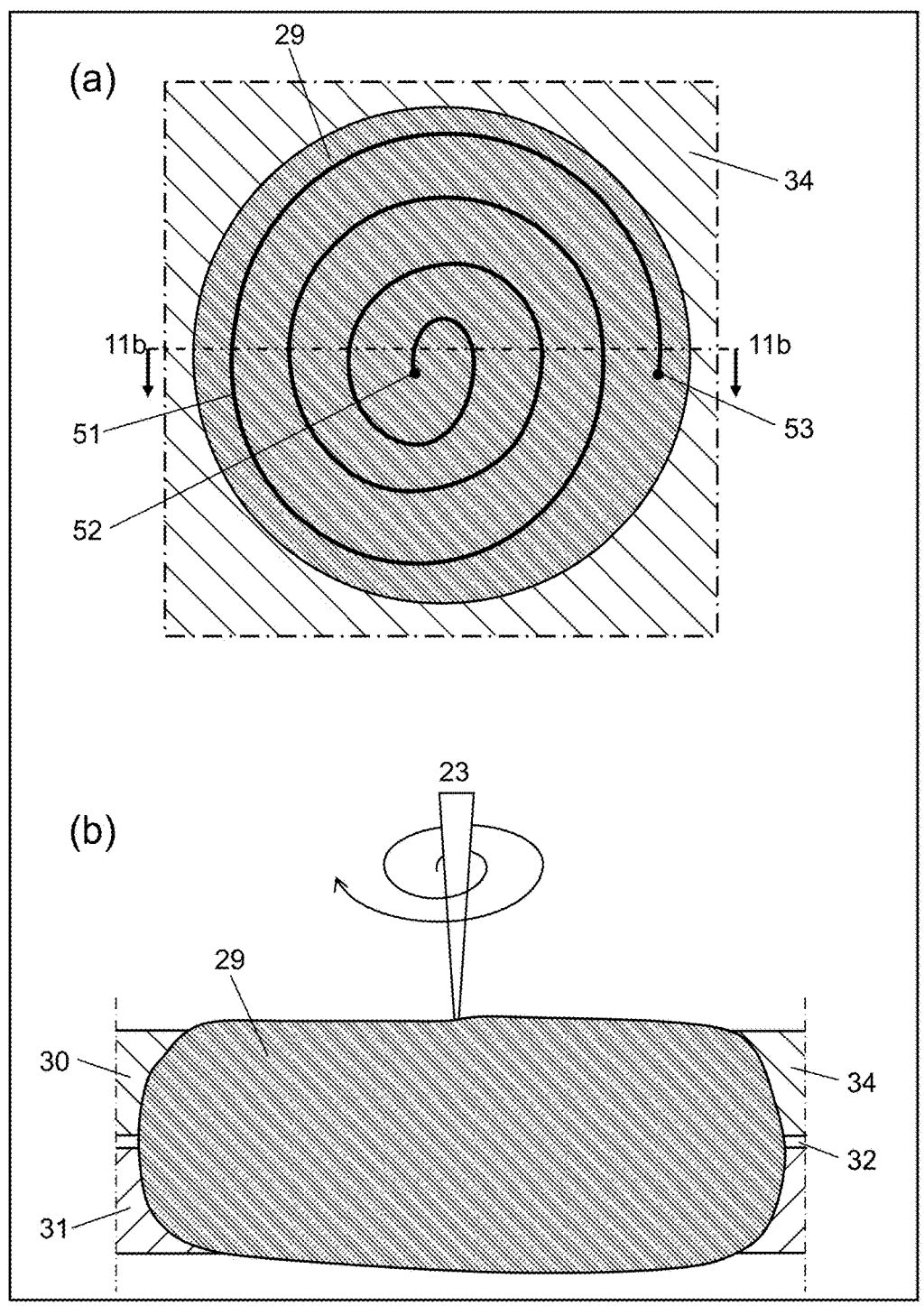
FIG. 11 shows states of the laser welding in the first example, portion (a) of FIG. 11 is a top view and portion (b) of FIG. 11 is a sectional view.

Next, in contrast with the first and second comparative examples, the first example for implementing the present disclosure is described with reference to FIGS. 9 to 11. FIG. 9 is a plan view showing results of laser welding in a first example, portion (a) of FIG. 9 is a plan view of an upper surface and portion (b) of FIG. 9 is a plan view of a lower surface. FIG. 10 is a sectional view showing a principle of the laser welding in the present example. FIG. 11 shows states of the laser welding in the first example, portion (a) of FIG. 11 is a top view and portion (b) of FIG. 11 is a sectional view. It should be noted that identical reference marks are used for identical configurations in FIGS. 3 to 5, and description of the reference marks may be omitted.

Portion (a) of FIG. 9 is the plan view of the upper surface and portion (b) of FIG. 9 is a plan view of the lower surface, showing welding states (machining results) of the upper surface and the lower surface of overlaid workpieces in a case where spiral path laser welding is performed on the workpieces according to the third welding condition.

As shown in FIGS. 9(*a*) and 9(*b*), in a case where the laser welding is performed in the third welding condition, the upper surface and the lower surface of the workpieces are melted, neither hole nor cavity is found, and a good welding result is obtained.

Next, the principle of the laser welding in the present example is considered and a laser welding method of the present example is described with reference to FIGS. 10 and 11.

The keyhole type laser welding in which an outside and front of molten pool 22 is irradiated with laser beam 23 is performed in the third welding condition. First, the workpieces are prepared by overlaying first metal plate 30 (a first workpiece) and second metal plate 31 (a second workpiece) so that a machining region (a first machining region) overlaps with first metal plate 30 and second metal plate 31 (a first step). At this time, gap 32 is formed between first metal plate 30 and second metal plate 31 in the machining region. However, this gap 32 is not necessarily formed. Furthermore, the machining region is circular in the present example. However, the machining region is not limited to the circular shape and may be a polygon, such as a triangle or a rectangle.

Next, the machining region of the workpieces is irradiated with laser beam 23, and first metal plate 30 and second metal plate 31 are joined by the laser welding. At this time, laser beam 23 is spirally moved within the machining region (a second step). As shown in FIG. 10, keyhole 21 is generated in the laser welding of the present example. With this configuration, an energy absorption rate of the workpieces is high, and a sufficient penetration quantity is obtained. Then, unmolten portion 34 (a solid phase portion) disposed at an outside and front of molten pool 22 (a liquid phase portion) is irradiated with laser beam 23 at the relatively fast welding speed of 3 m/min or more. That is, laser beam 23 only melts first metal plate 30 and second metal plate 31 on front wall 25 (a portion shown by a thick solid line) of keyhole 21 disposed on a front side in welding direction 24, and vaporization of the molten metal is suppressed. In other words, laser beam 23 moves toward unmolten portion 34 and moves so that molten pool 22 is not irradiated with laser beam 23. With this configuration, generation of metal vapor 26 is suppressed, and metal vapor 26 does not enter molten pool 22 from rear wall 27 (a portion shown by a thick dotted line) of keyhole 21 of molten pool 22 formed on a rear side in welding direction 24. Accordingly, there is no porosity even within resolidified layer 29 where molten pool 22 is cooled and solidified.

Next, a principle and a laser welding step of the present example are further described with reference to FIGS. 10, 11(a), and 11(b). Portion (b) of FIG. 11 is a sectional view taken along a line 11b-11b in portion (a) of FIG. 11. As shown in portion (a) of FIG. 11, the workpieces are spirally irradiated with laser beam 23 according to the third welding condition. Specifically, as shown in FIG. 10, unmolten portion 34 of first metal plate 30 and second metal plate 31 is irradiated with laser beam 23 from above first metal plate 30. As shown in portion (a) of FIG. 11, the irradiation of laser beam 23 is started from start point 52, laser beam 23 is moved along path 51 shown by a thick line, and the irradiation of laser beam 23 is ended at end point 53. Start point 52 is, for example, a center of the machining region. Then, resolidified layer 29 is formed in a region substantially corresponding to the machining region, and unmolten portion 34 exists around the machining region. Start point 52 is an inner end of path 51, and end point 53 is an outer end of path 51.

Since the laser welding according to the third welding condition is the keyhole type laser welding, both of first metal plate 30 and second metal plate 31 can obtain sufficient penetration. Furthermore, as shown in FIG. 10, when gap 32 exists between first metal plate 30 and second metal plate 31, gap 32 can be filled with the molten metal of molten pool 22. Furthermore, since bubble 28 is not generated inside molten pool 22, a cavity or hole is not generated near the surfaces (the upper surface and the lower surface of the workpieces) at a center of molten pool 22. Therefore, a junction area between first metal plate 30 and second metal plate 31 is wide, and sufficient junction strength can be obtained.

From the welding conditions and the welding results of the first and second comparative examples and the first example, the present inventors have found that the third welding condition is preferable as a welding condition capable of obtaining a good welding state. In the third welding condition, molten pool 22 is not irradiated with laser beam 23, but unmolten portion 34 of the metal plates (the workpieces) is always irradiated with laser beam 23 with a power density for the keyhole type laser welding. With this configuration, cavity or hole 33 is not generated within resolidified layer 29. The present disclosure is achieved by utilizing a relationship between the energy, the laser irradiation position, and the welding speed of such a laser beam. It should be noted that the power density of above-described laser beam 23 is determined by a combination of energy of laser beam 23 and a beam diameter of laser beam 23.

Moreover, the laser welding method of the first example is described by way of a concrete welding condition. The laser welding method of the first example can be implemented, for example, by the laser welding system shown in FIG. 1 or FIG. 2.

In the laser welding method of the present example, first metal plate 30 and second metal plate 31 are made of soft steel with a plate thickness t of 0.8 mm. The welding is performed by spirally irradiating the workpieces formed by overlaying first metal plate 30 and second metal plate 31 with laser beam 23 from a side of first metal plate 30. A diameter of a beam (hereinafter, referred to as a beam diameter) of laser beam 23 on the workpieces ranges from 0.5 mm to 0.7 mm. Here, a moving direction of laser beam 23 is not toward the liquid phase portion, which is molten pool 22 formed by the irradiation of laser beam 23, but toward the solid phase portion, which is unmolten portion 34. This can suppress vaporization of the molten metal of molten pool 22. At this time, the beam diameter of laser beam 23 on the workpieces becomes especially important. It is preferable that an interval between paths 51 of laser beam 23 be at least equal to or larger than the beam diameter of laser beam 23 so that the same part of the workpieces is not irradiated with laser beam 23. With this configuration, the molten metal formed by irradiating with laser beam 23 once is not irradiated with laser beam 23 again. Furthermore, it is preferable that the interval between paths 51 of laser beam 23 be twice or smaller than the beam diameter of laser beam 23. With this configuration, a region which is not irradiated with laser beam 23 can be melted by remaining heat, and the workpieces in the machining region are always melted.

Moreover, the laser welding is performed by irradiating with laser beam 23 while laser beam 23 is spirally moved at a high speed. In the present example, for example, it is preferable that the laser welding be performed at the welding speed of 3 m/min or more. Due to this welding speed, both of first metal plate 30 and second metal plate 31 can be sufficiently melted, and laser beam 23 can be moved before vaporizing the molten metal. It is preferable that the moving speed of laser beam 23 serving as the welding speed and the energy of laser beam 23 have a proportional relationship. With this configuration, quantity of heat supplied to a unit distance becomes constant. Moreover, in the present example, even in a case where gap 32 exists between first metal plate 30 and second metal plate 31, gap 32 can be filled with molten pool 22 (melt), and a tolerance of gap 32 can be increased.

Gap 32 between overlaid first metal plate 30 and second metal plate 31 is described herein. When gap 32 exists between first metal plate 30 and second metal plate 31, heat conduction from first metal plate 30 to second metal plate 31 is reduced, and first metal plate 30 is easily melted, as compared with a case where gap 32 does not exist. As with the first comparative example, this is a state in which metal vapor 26 is easily generated from the molten metal of first metal plate 30. Accordingly, it is preferable that the welding speed of a case where gap 32 exists be set faster than the welding speed of a case where gap 32 does not exist. Also, it is preferable that the output of laser beam 23 of the case where gap 32 exists be set higher than the output of laser beam 23 of the case where gap 32 does not exist. In the aforementioned step of preparing the workpieces, a step of overlaying first metal plate 30 (the first workpiece) and second metal plate 31 (the second workpiece) in the machining region (the first machining region) so as to form a gap serves as a first step. Furthermore, a step of overlaying first metal plate 30 (a third workpiece) and second metal plate 31 (a fourth workpiece) so as not to form a gap in the machining region (a second machining region), i.e., so as to bring into contact with each other, serves as a third step. Moreover, a step of performing laser irradiation on the workpieces prepared in the first step serves as a second step, and a step of performing laser irradiation on the workpieces prepared in the third step serves as a fourth step.

By doing in this way, even in the case where gap 32 exists between first metal plate 30 and second metal plate 31, good laser welding can be performed as with the case where gap 32 does not exist. It should be noted that the welding condition of the case where gap 32 exists between first metal plate 30 and second metal plate 31 and the welding condition of the case where gap 32 does not exist may be determined in advance by, for example, an experiment.

Second Example

Figure 12:
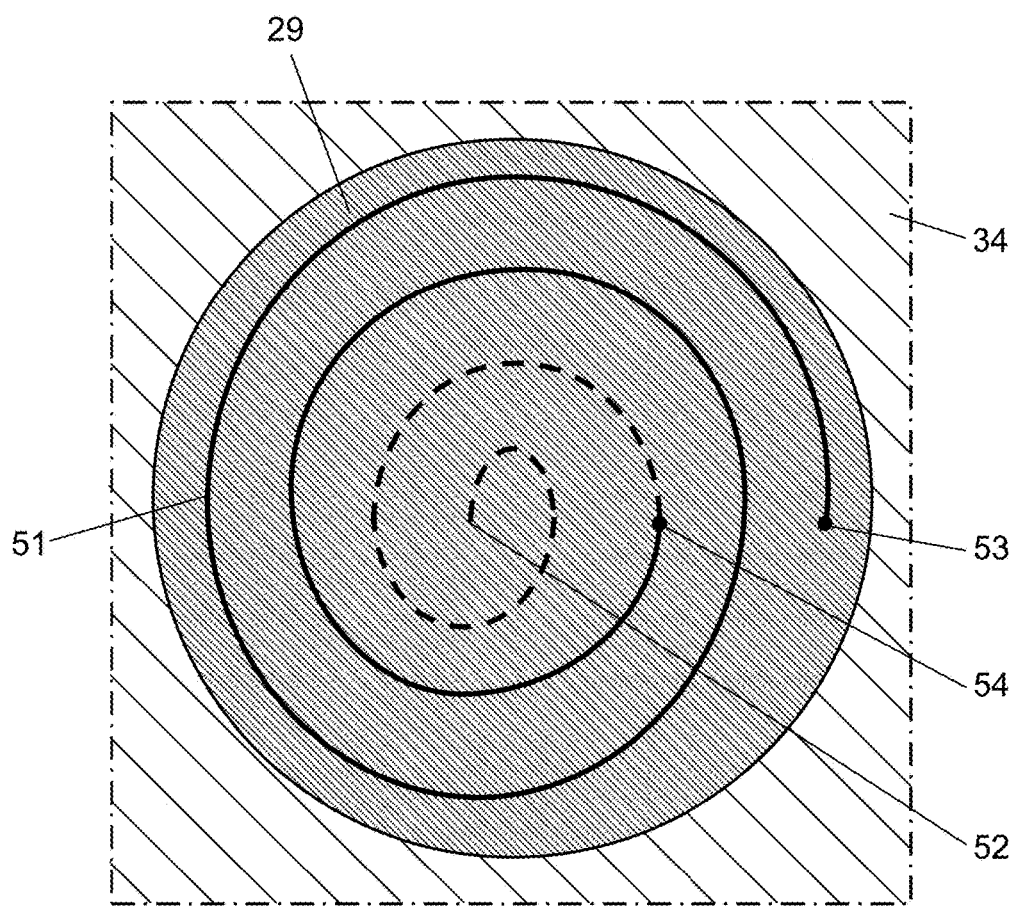
FIG. 12 is a top view showing a state of laser welding in a second example.

Next, a second example for implementing the present disclosure is described with reference to FIG. 12. FIG. 12 is a top view showing a state of laser welding in the present example. It should be noted that identical reference marks are used for identical configurations in portion (a) of FIG. 11, and description of the reference marks is omitted.

Figure 13:
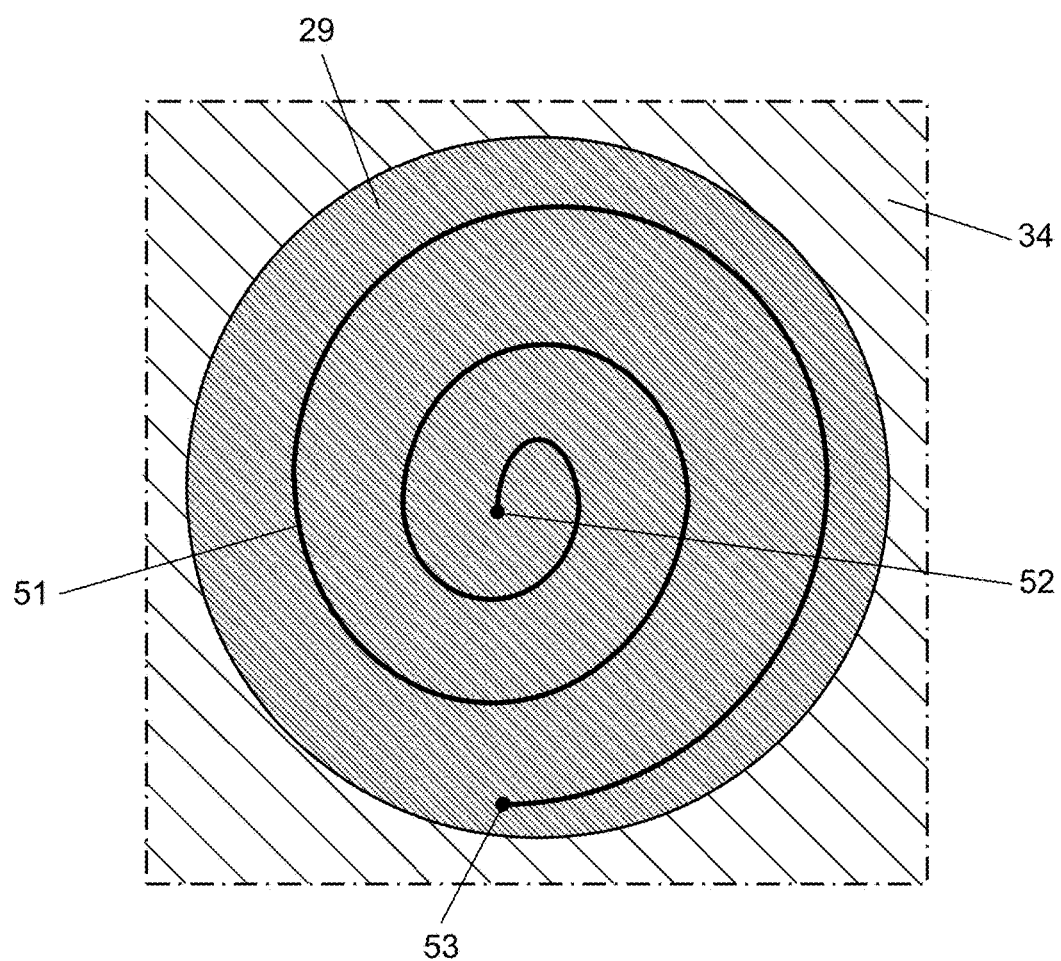
FIG. 13 is a top view showing a state of laser welding in a third example.

A temperature of spiral path 51 of laser beam 23 increases in a portion toward a center of molten pool 22 as far as an interval between adjacent paths 51 is equal. Accordingly, molten pool 22 is easily widened, and molten pool 22 is easily irradiated with laser beam 23. In order to avoid the irradiation of molten pool 22, a laser welding method of the present example is performed as follows. As illustrated in FIG. 13, in a case where the welding is performed by spirally irradiating with laser beam 23 from an inside to an outside, second start point 54 serves as an irradiation start position where the spiral irradiation of laser beam 23 is performed. Second start point 54 is positioned outward of start point 52 (a center of a machining region) in the first example. For example, it should be noted that the position of second start point 54 is a position away from the center of the machining region by more than half of a beam diameter (a radius of the beam diameter) of laser beam 23. It should be noted that a vicinity of the center of the machining region which is not irradiated with laser beam 23 is melted by remaining heat from peripheral molten pool 22.

Third Example

Next, a third example for implementing the present disclosure is described with reference to FIG. 13. FIG. 13 is a top view showing a state of laser welding in the present example. It should be noted that identical reference marks are used for identical configurations in portion (a) of FIG. 11, and description of the reference marks is omitted.

A temperature of spiral path 51 of laser beam 23 increases in a portion toward a center of molten pool 22 as far as an interval between adjacent paths 51 is equal. Accordingly, molten pool 22 is easily widened, and molten pool 22 is easily irradiated with laser beam 23. In order to avoid the irradiation of molten pool 22, a laser welding method of the present example is performed as follows. As illustrated in FIG. 13, workpieces are irradiated with laser beam 23 so that the interval between adjacent paths 51 is wider toward an outside of a spiral shape. In this way, laser beam 23 is spirally irradiated while the interval between inner path 51 and outer path 51 is widened toward an outside of a machining region so that path 51 of laser beam 23 does not go over molten pool 22. It should be noted that, when the interval between adjacent paths 51 of laser beam 23 is widened, unmolten portion 34 is melted by remaining heat.

Furthermore, in order to prevent laser beam 23 from passing through molten pool 22 caused by overlapping of paths 51 of laser beam 23, a beam diameter of laser beam 23 is set smaller than the interval between adjacent paths 51 of laser beam 23.

Fourth Example

Figure 14:
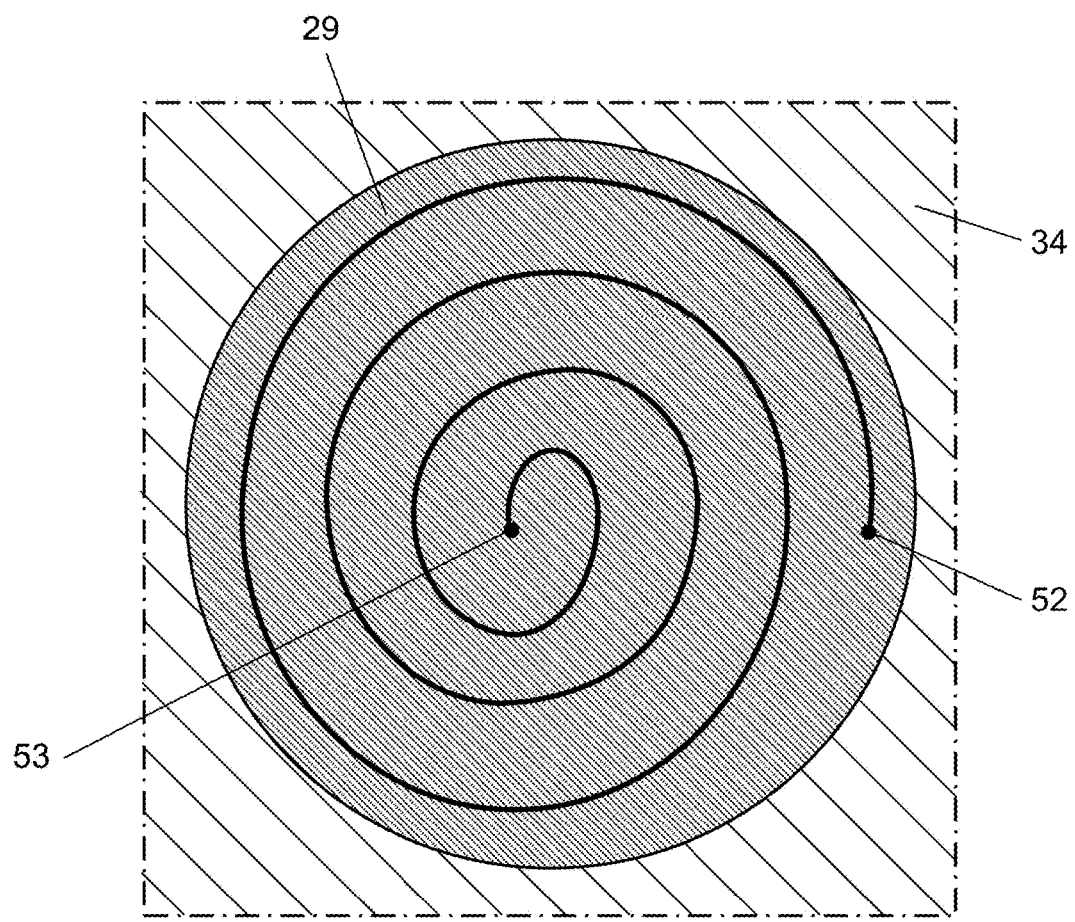
FIG. 14 is a top view showing a state of laser welding in a fourth example.

Next, a fourth example for implementing the present disclosure is described with reference to FIG. 14. FIG. 14 is a top view showing a state of laser welding in the present example. It should be noted that identical reference marks are used for identical configurations in portion (a) of FIG. 11, and description of the reference marks is omitted.

A temperature of spiral path 51 of laser beam 23 increases in a portion toward a center of molten pool 22 as far as an interval between adjacent paths 51 is equal. Accordingly, molten pool 22 is easily widened, and molten pool 22 is easily irradiated with laser beam 23. In order to avoid the irradiation of molten pool 22, a laser welding method of the present example is performed as follows. As illustrated in FIG. 14, start point 52 serves as an irradiation start position of spiral laser beam 23, and end point 53 serves as an end position of laser beam 23. In other words, the laser welding is performed by spirally irradiating workpieces with laser beam 23 from an outside to an inside. It should be noted that start point 52 is near an outside of a machining region irradiated with spiral laser beam 23. In this way, the laser welding is started from an outer edge of the machining region where heat radiation caused by heat conduction is excellent, and the welding is performed toward a center of the machining region. Accordingly, when the laser welding is started, an increase in temperature due to heat accumulation in a portion irradiated with laser beam 23 can be suppressed. In other words, excessive melting of a portion which is not irradiated with laser beam 23 can be prevented by heat conduction. It should be noted that, in the first to third examples, the moving direction of spiral laser beam 23 is from the inside to the outside. However, the moving direction of laser beam 23 may be from the outside to the inside.

As the above-described first to fourth examples, the unmolten portion of the workpieces is irradiated with laser beam 23 in the laser welding method of the present exemplary embodiment. Therefore, a good welding state can be obtained without depending on the plate thickness of the workpieces. It should be noted that the spiral path for irradiating the unmolten portion of the workpieces with laser beam 23 may be determined in advance by, for example, an experiment.

Furthermore, in the laser welding method of the present exemplary embodiment, the temperature of spiral path 51 of laser beam 23 increases in the portion toward the center of molten pool 22 as far as the interval between adjacent paths 51 is equal. Accordingly, molten pool 22 is easily widened, and an inside of molten pool 22 is easily irradiated with laser beam 23. Therefore, in the first to fourth examples, it is preferable that the workpieces be irradiated with laser beam 23 so that the welding speed increases toward an outside of spiral path 51. When the welding speed is increased, the unmolten portion is melted by remaining heat. Furthermore, in the first to fourth examples, it is preferable that the workpieces be irradiated with laser beam 23 so that the output of laser beam 23 is lower toward the outside of the spiral shape. When the output of laser beam 23 is lowered, the unmolten portion is melted by the remaining heat.

As described above, in the laser welding method of the present exemplary embodiment, the two or more vertically overlaid metal plates are laser-welded by laser beam 23, and the bubbles mainly generated from the rear wall of the keyhole are suppressed during the laser welding. Accordingly, in the laser welding method of the present exemplary embodiment, the workpieces are laser-welded by always irradiating the solid phase portion of the workpieces with laser beam 23. Furthermore, the output of the laser beam during the laser welding is set so as to perform the keyhole type laser welding. Furthermore, the welding speed during the laser welding is set so that the enlarged molten pool 22 is not irradiated with laser beam 23 again.

According to such a laser welding method of the present exemplary embodiment, a good welding state can be always obtained regardless of the plate thickness.

Furthermore, in the present exemplary embodiment, it is desirable that the interval between adjacent paths 51 in a case of irradiating with laser beam 23 in the spiral path be equal to or larger than the beam diameter of laser beam 23 and twice or smaller than the beam diameter of laser beam 23. The reason is described below.

FIG. 15 shows an experimental result carried out by the present inventors. FIG. 15 is a diagram showing a relationship between an interval between adjacent paths 51 of laser beam 23 and occurrence of poor weld (a projection caused by a recess/cavity). In lap-welding of soft steel with a plate thickness t of 0.8 mm, irradiation is performed in a spiral path with laser beam 23 with a beam diameter ranging from 0.5 mm to 0.7 mm, and laser welding is performed at different path intervals. The result is shown in FIG. 15. An intensity distribution of laser beam 23 is a Top Hat Type near the beam diameter. The diameter of a laser welding mark is set to 5.4 mm corresponding to about $6\sqrt{t}$.

The welding was performed by adjusting at a welding speed of 3 m/min and at a laser output of between 1.5 kW to 3.0 kW so that piercing welding is always performed. As a result, a good laser welding mark is obtained when a value obtained by dividing the path interval by an irradiation diameter ranges from one time to two times.

However, in a case where the intensity distribution of laser beam 23 is not the Top Hat Type but a Gaussian Type, an outer edge of the beam diameter of the laser beam does not contribute to the welding. Accordingly, an excellent laser welding mark can be obtained even when the path interval is equal to or smaller than the beam diameter (the above-described magnification is one time or smaller).

Furthermore, in the laser welding method of the present exemplary embodiment, the welding is performed so that the laser welding mark on the upper surface and the lower surface of the workpieces is not linear but planar.

Furthermore, a target of the laser welding method of the present exemplary embodiment is the laser welding mark with a size in which it is necessary to consider a heat effect during the laser welding. For example, in a case where a half of a sum of the plate thickness of the lap welded plates is T, a diameter of the laser welding mark is $6\sqrt{T}$ or smaller.

Examples of each parameter in a case where metal plates with various plate thicknesses are lap-welded are described herein. It should be noted that a marginal output of the laser beam which does not cause burn through and an extent of the machining region for obtaining a sufficient junction intensity are determined by the plate thickness in the laser welding. It should be noted that the beam diameter of the laser beam ranges from 0.5 mm to 0.7 mm For example, when the workpiece is made of iron and has a plate thickness of 0.6 mm, the output of the laser beam is preferably 2.80 kW, and a radius of the machining region is preferably 1.55 mm. In this condition, it is preferable that a rotation speed (the welding speed) be 10.0 m/min and a number of spiral rotations be two.

Furthermore, for example, when the workpiece is made of iron and has a plate thickness of 0.8 mm, the output of the laser beam is preferably 3.30 kW, and the radius of the machining region is preferably 1.79 mm. In this condition, it is preferable that the rotation speed be 8.7 m/min and the number of spiral rotations is two.

Furthermore, for example, when the workpiece is made of iron and has a plate thickness of 1.0 mm, the output of the laser beam is preferably 3.55 kW, and the radius of the machining region is preferably 2.00 mm. In this condition, it is preferable that the rotation speed be 7.4 m/min and the number of spiral rotations is three.

Furthermore, for example, when the workpiece is made of iron and has a plate thickness of 1.2 mm, the output of the laser beam is preferably 3.65 kW, and the radius of the machining region is preferably 2.19 mm. In this condition, it is preferable that the rotation speed be 6.3 m/min and the number of spiral rotations be three.

Furthermore, for example, when the workpiece is made of iron and has a plate thickness of 1.6 mm, the output of the laser beam is preferably 3.65 kW, and the radius of the machining region is preferably 2.53 mm. In this condition, it is preferable that the rotation speed be 4.4 m/min and the number of spiral rotations be four.

In this way, the output of the laser beam required becomes large as the plate thickness is thickened. However, since the laser oscillator also has a limit, it is possible to adjust the output of the laser beam by the welding speed. Furthermore, in order to achieve the effect of the present disclosure, the welding speed is 3 m/min or more. Moreover, as the plate thickness is thicker, it is preferable that the radius of the machining region be larger to obtain the sufficient junction intensity. Also, the number of spiral rotations increases as the radius of the machining region is larger.

It should be noted that an example, in which the laser welding is performed by overlaying the two metal plates, has been shown in the present exemplary embodiment. However, the present exemplary embodiment can be also applied to a case where laser welding is performed by overlaying three or more metal plates.

Furthermore, in addition to the circular arc, the spiral shape can be various shapes, such as a polygon of a rectangle or a triangle, or a discontinuous circular arc with an interrupted part.

Furthermore, the spiral irradiation of spiral laser beam 23 may be performed from the center or the inside of the machining region to the outside of the machining region. Alternatively, the spiral irradiation may be performed from the outside of the machining region to the center or the inside of the machining region.

Furthermore, in order to obtain the good welding result, an example in which the welding speed of laser beam 23, the rotation interval of laser beam 23, the output of laser beam 23, and the like are appropriately determined has been described in the present exemplary embodiment. It should be noted that these correspondences may be implemented by appropriately combining all of these correspondences or selecting a plurality of correspondences from all of these correspondences.

INDUSTRIAL APPLICABILITY

Since generation of bubbles is suppressed and a good welding state can be realized, the present disclosure is industrially useful as a laser welding method in which laser welding is performed by overlaying workpieces.

REFERENCE MARKS IN THE DRAWINGS 1 laser oscillator
2 galvano scanner
3 galvano mirror
4 galvano motor
5 scanner control device
6 Fθ lens
7 welding head
8 robot
9 robot control device
10 laser welding system
20 laser welding system
21 keyhole
22 molten pool
23 laser beam
24 welding direction
25 front wall
26 metal vapor
28 bubble
29 resolidified layer
30 first metal plate
31 second metal plate
32 gap
33 hole
34 unmolten portion
51 path
52 start point
53 end point
54 second start point

The invention claimed is:

1. A laser welding method comprising:
a first step of overlaying a first workpiece and a second workpiece in a first machining region; and
a second step of irradiating the first workpiece and the second workpiece with a laser beam in the first machining region while the laser beam is moved in a spiral path,
wherein in the second step,
the first workpiece and the second workpiece are melted by irradiation of the laser beam to form a liquid phase portion, and
the laser beam is moved so that the liquid phase portion is not irradiated with the laser beam.

2. The laser welding method according to claim 1, wherein an interval between paths adjacent to each other in a radial direction of the spiral path is equal to or larger than a beam diameter of the laser beam and twice or smaller than the beam diameter of the laser beam.

3. The laser welding method according to claim 1, wherein an inner end of the spiral path is different from a center of the first machining region.

4. The laser welding method according to claim 3, wherein a distance between the inner end of the spiral path and the center of the first machining region is greater than a radius of an irradiation diameter of the laser beam.

5. The laser welding method according to claim 1, wherein the interval between the paths adjacent to each other in the radial direction is longer toward an outer side of the spiral path.

6. The laser welding method according to claim 1, wherein in the second step, a moving speed of the laser beam is faster toward the outer side of the spiral path.

7. The laser welding method according to claim 1, wherein an output of the laser beam is lower toward the outer side of the spiral path.

8. The laser welding method according to claim 1, wherein in the second step, the laser beam moves from an inner side of the spiral path to the outer side of the spiral path.

9. The laser welding method according to claim 1, wherein in the second step, the laser beam moves from the outer side of the spiral path to an inner side of the spiral path.

10. The laser welding method according to claim 1, comprising:
a third step of overlaying a third workpiece and a fourth workpiece in a second machining region; and
a fourth step of irradiating the third workpiece and the fourth workpiece with a laser beam in the second machining region while the laser beam is moved in a spiral path,
wherein in the fourth step,
the third workpiece and the fourth workpiece are melted by irradiation of the laser beam to form a liquid phase portion,
the laser beam is moved so that the liquid phase portion is not irradiated with the laser beam again,
a gap exists between the first workpiece and the second workpiece in the first machining region,
the third workpiece and the fourth workpiece are in contact with each other in the second machining region,
a first moving speed of the laser beam in the second step is faster than a second moving speed of the laser beam in the fourth step, and
a first output of the laser beam in the second step is higher than a second output of the laser beam in the fourth step.

* * * * *